Figure 1:
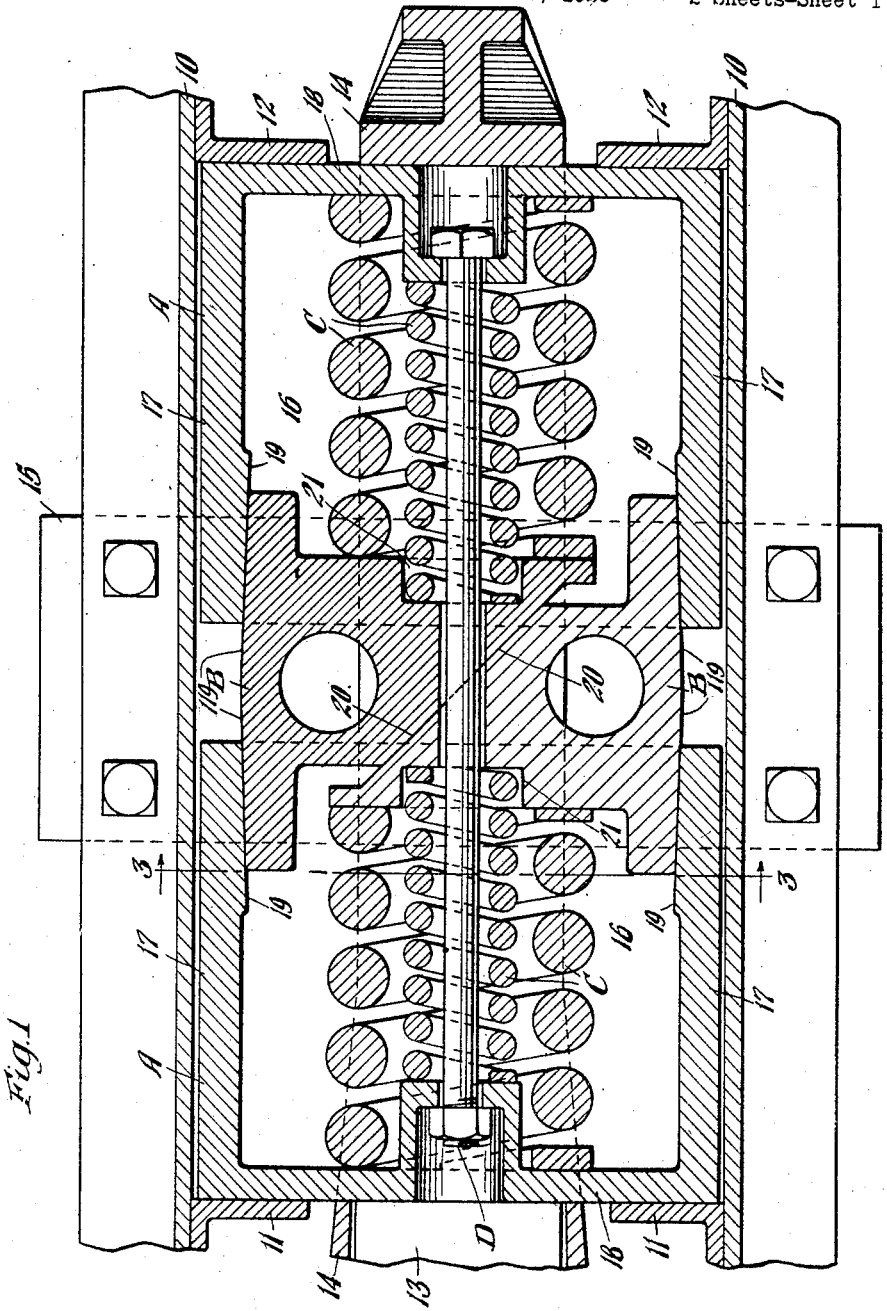

Nov. 30, 1926.

J. F. O'CONNOR 1,608,951

FRICTION SHOCK ABSORBING MECHANISM

Filed Jan. 22, 1926   2 Sheets-Sheet 1

Witness
Wm. Geiger

Inventor
John F. O'Connor
By George I. Haight
His Atty

Nov. 30, 1926.　　　　　　　　　　　　　　　　　　　　　1,608,951
J. F. O'CONNOR
FRICTION SHOCK ABSORBING MECHANISM
Filed Jan. 22, 1926　　2 Sheets-Sheet 2
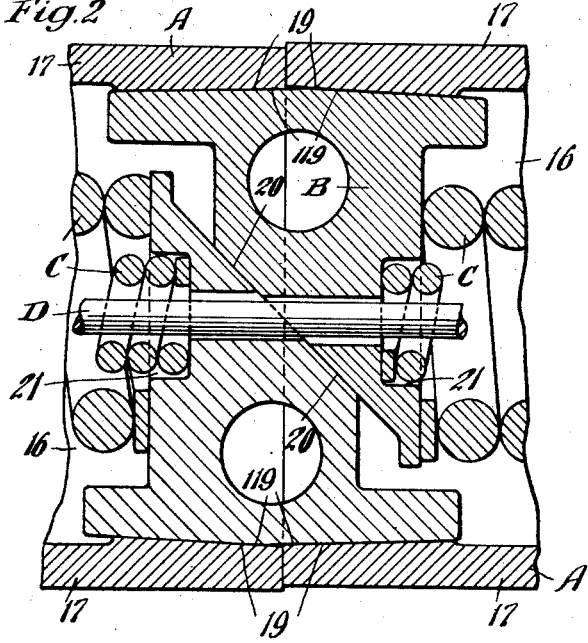
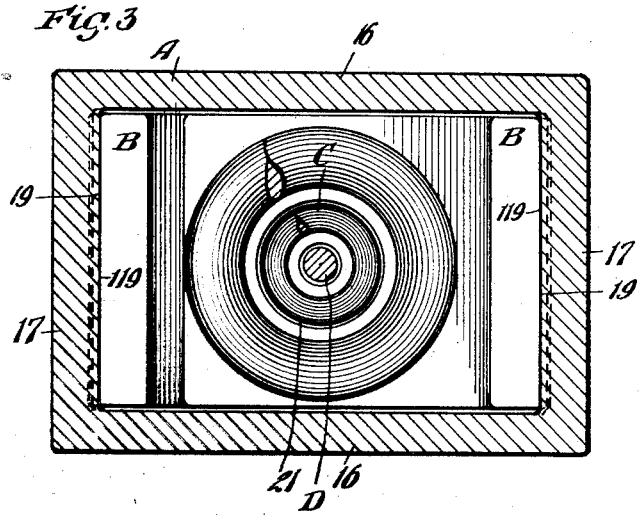
Witness
Wm. Geiger
Inventor
John F. O'Connor
By George I. Haight
His Atty.

Patented Nov. 30, 1926.

1,608,951

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed January 22, 1926. Serial No. 82,923.

This invention relates to improvements in friction shock absorbing mechanisms.

One object of the invention is to provide a friction shock absorbing mechanism, especially adapted for railway draft riggings, having high capacity and insured release, including a pair of relatively movable friction shells and a friction wedge system co-operating with the shells, wherein the elements of the friction wedge system have friction surfaces co-operating with the shells respectively.

Another object of the invention is to provide a mechanism of the character indicated, employing a friction system including interengaging wedge friction elements having friction surfaces co-operating with a pair of relatively movable friction elements each having longitudinally disposed, converging friction surfaces, engaging the friction surfaces of the wedge shoes, whereby upon relative approach of the friction elements a differential action is effected which is taken care of by relative movement of the wedge friction shoes on the inter-engaging wedge faces thereof.

Other objects and advantages of this invention will more fully and clearly appear from the description and claims hereinafter following.

In the drawings, forming a part of this specification, Figure 1 is a horizontal, longitudinal, sectional view of a portion of a railway draft rigging, showing my improvements in connection therewith. Figure 2 is a view similar to Figure 1, partly broken away, and showing the central portion of the friction system, the parts being illustrated in the position they assume when the mechanism is fully compressed. And Figure 3 is a transverse vertical sectional view corresponding to the line 3—3 of Figure 1.

In said drawings, 10—10 indicate the usual channel shaped center or draft sills of a railway car underframe, to the inner faces of which are secured front stop lugs 11—11 and rear stop lugs 12—12. The inner end portion of the drawbar is designated by 13, to which is operatively connected a yoke 14 of well-known form. The shock absorbing mechanism proper, hereinafter more fully described, is disposed within the yoke, the yoke in turn being supported in operative position by a detachable saddle plate 15 secured to the draft sills.

The improved shock absorbing mechanism proper, as shown, comprises, broadly: front and rear friction shells A—A; two friction wedge shoes B—B; front and rear spring resistance elements C—C; and a retainer bolt D.

The front and rear friction shells or casings A are of the same design, each being in the form of a substantially rectangular box-like casting having horizontally disposed, spaced, top and bottom walls 16—16; longitudinally disposed, spaced, vertical side walls 17—17; and a transverse outer end wall 18. The end wall 18 co-operates with the corresponding stop lugs on the draft sills in the manner of the usual follower. The side walls 17 of each shell are provided with opposed interior longitudinally disposed flat friction surfaces 19—19, the friction surfaces of each casing coverging inwardly thereof.

The friction wedge shoes B are of like design, each being in the form of a block having an inner wedge face 20 disposed at a relatively blunt angle with reference to the longitudinal axis of the mechanism. On the other side, each shoe has a pair of friction surfaces 119—119, the surfaces 119 being arranged at the front and rear ends of the block and co-operating respectively with one of the friction surfaces 19 of the front follower casing and one of the friction surfaces 19 of the rear follower casing. The two surfaces 119 of each shoe are correspondingly inclined to the friction surfaces 19 of the front and rear shells at the same side of the mechanism. As most clearly shown in Figure 1, the shoes B are arranged at opposite sides of the mechanism and have the wedge faces 20 thereof inter-engaged.

The spring resistance elements C are two in number, arranged at the front and rear ends of the mechanism respectively. Each unit C comprises a relatively heavy outer coil having the opposite ends thereof bearing on the transverse end wall 18 of one of the follower casings and the inner end of one of the friction wedge shoes B, and an inner coil bearing on a hollow boss projecting from the transverse end wall of the corresponding shell and on the inner end of one of the wedge shoes, the shoe being recessed as indicated at 21 to accommodate the corresponding end of the spring. As shown in Figure 1, the front spring resistance C opposes movement of the shoe B co-operating with the friction wedge surfaces 19 at one side of the mechanism, while the rear spring resistance C co-operates with the friction wedge shoe B engaging the friction surfaces 19 at the other side of the mechanism.

The mechanism is held of uniform overall length by a retainer bolt D which has the opposite ends thereof anchored in the hollow bosses of the front and rear friction shells. The retainer bolt in addition to holding the parts assembled, also serves to maintain the mechanism under a predetermined initial compression. Compensation for wear of the various friction and wedge faces is had by the expansive action of the spring resistance elements C which are held under initial compression by the retainer bolt as pointed out.

In the normal full release position of the parts, the inner ends of the front and rear friction shells A are spaced apart a sufficient distance to permit the shells to inter-engage when the mechanism is fully compressed, the shells thereby acting as solid column load-transmitting members to transmit the actuating force to the corresponding stop lugs and relieve the main springs from excessive pressure.

The operation of my improved shock absorbing mechanism, assuming a compression stroke, is as follows: The front and rear friction shells A will be moved relatively toward each other, compressing the main spring resistance elements C, thereby forcing the wedge friction shoes B into intimate contact. During the approach of the friction shells A, due to the converging relation of the friction surfaces 19 thereof, the shoes B will be forced laterally toward each other. During the relative lateral movement of the shoes B, slippage will occur on the inter-engaging wedge faces 20 thereof, these faces being sufficiently blunt with reference to the longitudinal axis of the mechanism to permit of such action. Due to the differential action just described, the friction system comprising the wedge friction shoes B will be elongated longitudinally of the mechanism, thereby effecting an additional compression of the main spring resistance elements C. Due to the lateral movement of the friction shoes just described, there will be a slight relative lateral displacement of the front and rear friction shells, as most clearly indicated in Figure 2. The necessary relative movement of the friction shells to assume the condition illustrated in Figure 2 is permitted by allowing sufficient clearance between the side walls of the friction shells A and the draft sills as clearly illustrated in Figure 1. Relative approach of the front and rear friction shells will be limited by the inner ends thereof coming into engagement, as hereinbefore pointed out, the actuating force then being transmitted through the shells to the stop lugs on the draft sills.

When the actuating pressure is reduced, the main spring resistance elements C will force the friction shells outwardly and move the shoes relatively to each other, thereby restoring the parts to the full release position illustrated in Figure 1.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with front and rear followers relatively movable toward and away from each other, each of said followers having longitudinally disposed friction surfaces; of a pair of friction elements, each having friction surfaces respectively co-operating with a friction surface of the front follower and a friction surface of the rear follower, said friction elements having inter-engaging wedge faces; and spring resistance means interposed between each follower and the friction elements.

2. In a friction shock absorbing mechanism, the combination with front and rear follower members relatively movable toward and away from each other, each of said follower elements having longitudinally disposed, converging friction surfaces; a friction system including a plurality of friction elements having co-operating wedge faces, each of said elements having friction surfaces co-operating respectively with a friction surface of said front follower member and a friction surface of said rear follower member; and spring resistance means co-operating with said elements and followers.

3. In a friction shock absorbing mechanism, the combination with front and rear follower shells each having interior, longitudinally disposed converging friction surfaces, said shells being relatively movable toward and away from each other; of a pair of friction shoes, each shoe having front and rear friction surfaces co-operating respectively with the front and rear shells, said shoes having co-operating wedge faces; and spring resistance means interposed between each shell and the shoes.

4. In a friction shock absorbing mechanism, the combination with front and rear, relatively movable follower shells; of a plurality of friction shoes, each of said shoes and the front and rear shells having co-operating friction surfaces, and said shoes having co-operating wedge faces disposed at a relatively blunt angle with respect to the longitudinal axis of the mechanism; and means for yieldingly resisting relative movement of said follower shells and friction shoes.

5. In a friction shock absorbing mechanism, the combination with front and rear, relatively movable shells each having a pair of opposed, interior longitudinally arranged friction surfaces converging inwardly of the shell; of front and rear spring resistance elements; and a pair of friction shoes each having a pair of friction surfaces respectively correspondingly inclined to and co-operating with the friction surfaces of the front and rear shells at the same side of the mechanism, said shoes being interposed between the front and rear spring resistance elements and having inter-engaging wedge faces.

In witness that I claim the foregoing I have hereunto subscribed my name this 19th day of January, 1926.

JOHN F. O'CONNOR.